United States Patent [19]

Rapson

[11] 3,760,065
[45] Sept. 18, 1973

[54] PRODUCTION OF CHLORINE DIOXIDE

[75] Inventor: William Howard Rapson, Scarborough, Ontario, Canada

[73] Assignee: ERCO Industries Limited, Ontario, Canada

[22] Filed: May 28, 1971

[21] Appl. No.: 147,821

[30] Foreign Application Priority Data
May 29, 1970 Canada .................... 084077

[52] U.S. Cl. .............. 423/478, 423/500, 423/520, 423/552, 252/187 R
[51] Int. Cl. ...... C01b 11/02, C01d 5/02, C01b 7/02
[58] Field of Search .................. 423/478, 477, 520, 423/500, 551, 552; 23/152; 252/187 R

[56] References Cited
UNITED STATES PATENTS
| | | | |
|---|---|---|---|
| 3,341,288 | 9/1967 | Partridge et al. | 423/478 |
| 3,347,628 | 10/1967 | Sepall et al. | 252/187 R X |
| 3,563,702 | 2/1971 | Partridge et al. | 423/478 |

FOREIGN PATENTS OR APPLICATIONS
| | | | |
|---|---|---|---|
| 543,589 | 7/1957 | Canada | 23/152 |
| 1,056,790 | 1/1967 | Great Britain | 23/152 |
| 1,077,306 | 7/1967 | Great Britain | 23/152 |

Primary Examiner—Edward Stern
Attorney—Sim & McBurney

[57] ABSTRACT

Chlorine dioxide is produced from two reactors, the first reacting sodium chlorate, sodium chloride and/or hydrogen chloride, and sulphuric acid at an acidity in excess of 4.8N to deposit sodium acid sulphate, and the second reacting sodium chlorate, sodium chloride and/or hydrogen chloride, and a sulphate-ion material which is constituted at least in part by the sodium acid sulphate deposited in the first reaction, at an acidity less than 4.8N to deposit sodium sulphate. In an alternative embodiment, the reaction is carried out in three vessels, the first producing sodium acid sulphate which is used as at least part of the source of acid for a second reactor producing sodium sesquisulfate which in turn is used as at least part of the acid source of the third reactor.

10 Claims, 2 Drawing Figures

PRODUCTION OF CHLORINE DIOXIDE

This invention relates to the production of chlorine dioxide.

Chlorine dioxide is used in the bleaching of cellulosic materials, such as wood pulp produced by the Kraft and sulfite processes.

One of the known methods of production of chlorine dioxide involves reaction of an alkali metal chlorate, an alkali metal chloride and sulphuric acid. The reactions involved are as follows:

1. $MClO_3 + MCl + H_2SO_4 \rightarrow ClO_2 + \frac{1}{2}Cl_2 + M_2SO_4 + H_2O$ 2. $MClO_3 + 5MCl + 3H_2SO_4 \rightarrow 3Cl_2 + 3M_2SO_4 + 3H_2O$ where M is an alkali metal. Reaction 2 becomes significant when the mole ratio of chloride to chlorate substantially exceeds 1:1 Since no chlorine dioxide is produced by the process of equation 2, to maximize production of chlorine dioxide from chlorate, it is preferred to operate at an approximately equimolar or only slightly higher ratio of chloride to chlorate in the feed.

A method of operating the above system to produce chlorine dioxide and chlorine for use in bleaching, for example, wood pulp, and used commercially is known as the "Rapson R2" process, also known as the "Hooker R2" and "ER2" processes, as disclosed in Canadian Patent No. 543,589, issued July 16, 1957 to Electric Reduction Company of Canada, Limited. The Rapson R2 process involves introduction into a generator of a stream of an aqueous solution of an approximately equimolar or slightly higher proportion of sodium chloride and sodium chlorate and a stream of concentrated sulphuric acid. Air is introduced at the bottom of the generator to carry chlorine dioxide and chlorine produced in the generator out of the generator and to further processing to separate the chlorine dioxide and chlorine. The aqueous effluent from the generator contains sodium bisulphate ($NaHSO_4$) and unreacted sodium chlorate, sodium chloride and sulphuric acid. The sodium bisulphate may be crystallized out and the mother liquor returned to the generator. The sodium bisulphate may be mixed with sodium sesquisulphate ($Na_3H(SO_4)_2$), depending on the conditions of operation of the generator.

The R2 process generally is carried out under conditions of high acidity, such as about 10N. In accordance with an invention described in Canadian Patent 826,577 issued Nov. 4, 1969, to Electric Reduction Company of Canada, Limited, chlorine dioxide and chlorine can be obtained by reacting sodium chlorate, sodium chloride and sulphuric acid under conditions of low acidity, generally of the order of 2 to 4.8 N.

The effluent from the generator used in this low acidity operation contains sodium sulphate ($Na_2SO_4$) in addition to unreacted sodium chlorate, sodium chloride and sulphuric acid. The sodium sulphate may be recovered by either evaporating the solution, in which case the sodium sulphate is recovered as anhydrous sodium sulphate, or by cooling the solution, in which case the sodium sulphate is recovered as sodium sulphate decahydrate ($Na_2SO_4 \cdot 10H_2O$). The mother liquor then may be recycled to the generator.

In Canadian Patent 825,084 issued Oct. 14, 1969 to Electric Reduction Company of Canada, Limited, there is described a process of forming chlorine dioxide and chlorine from sodium chlorate, sodium chloride and sulphuric acid in which the chlorine dioxide and chlorine are generated and a sodium acid sulphate crystallized in the same vessel. This may be achieved by operating the generator at the boiling point of the reactants under reduced pressure. The water evaporated thereby serves to remove the chlorine dioxide and chlorine generated from the vessel, thereby eliminating the necessity of a separate air stream to remove the gaseous products from the vessel. In addition, the quantity of water is reduced in the vessel as the evaporation takes place, thereby inducing precipitation of the sodium acid sulphate within the vessel.

The sodium acid sulphate is recovered from the vessel and the spent reaction liquor containing unreacted sodium chlorate, sodium chloride and sulphuric acid may be returned to the generator.

The form of the sodium acid sulphate produced is dependent on the acidity and the temperature of the reacting liquor. The acid sulphate may be in the form of sodium bisulphate, i.e. $NaHSO_4$ or sodium sesquisulphate $Na_3H(SO_4)2$. Sodium sesquisulphate may be produced over an acidity range of 4.8 to 9N. For example, while sodium bisulphate may be produced at an acidity of 10N at about 75°C in boiling solution, sodium sesquisulphate may be produced at 8N acidity at about 30°C in boiling solution.

The process disclosed in the aforementioned Canadian Patent 826,577 and described above preferably is performed in a single vessel, wherein chlorine dioxide and chlorine are generated, water is evaporated and sodium sulphate is precipitated. Under the conditions of low acidity, i.e. about 2 to about 4.8N, the sodium sulphate deposited is generally anhydrous sodium sulphate ($Na_2SO_4$), possibly mixed with some sodium sesquisulphate at the high end of the acidity range.

In accordance with the present invention, at least two single vessel generator-evaporator-crystallizers are operated in sequence, at least one operating at high acidity and one at low acidity.

Single vessel generator-evaporator-crystallizers suitable for use in the process of the present invention are described in the abovementioned Canadian Patent No. 825,084.

A two-stage chlorine dioxide production operation in accordance with this invention comprises a first stage wherein sodium chlorate, a chloride which is sodium chloride, hydrochloric acid or mixtures thereof and sulphuric acid is reacted in aqueous medium in a single vessel generator-evaporator-crystallizer at an acidity in excess of 4.8N generally in the region of 5 to 12N, preferably 8 to 12N. Sufficient water is evaporated from the aqueous medium to induce crystallization of sodium acid sulphate. The form of the sodium acid sulphate as indicated above depends on the acidity and temperature of the reaction.

The evaporated water acts as a diluent for the chlorine dioxide and chlorine generated in the reaction, and the product gases are removed from the vessel as a gaseous mixture including the steam.

The sodium chlorate and sodium chloride may be introduced into the vessel as aqueous solutions or if desired in dry form. Any desired molar ratio of sodium chloride:sodium chlorate can be employed, but it is preferred to utilize an approximately equimolar ratio in order to maximize the production of chlorine dioxide in accordance with equation 1 above. Ratios of chloride:chlorate generally vary between 1:1 and 3:1, preferably about 1.1:1 to 1.3:1.

An aqueous solution containing both sodium chlorate and sodium chloride may be fed as one stream to the vessel and the sulphuric acid as a separate stream. Alternatively, aqueous solutions of sodium chlorate and sodium chloride may be fed as separate streams to the vessel.

The sulphuric acid generally is added to the vessel in concentrated form in order to produce the required acidity in the reaction medium.

Concentrations of chlorate and chloride in the reaction medium may vary over a wide range. For example, the concentration of the chlorate in the reacting solution may be in the range of about 0.005 to about 3 molar and the concentration of the chloride may be in the range of about 0.001 to about 2 molar.

The temperature of the reaction medium may vary over a wide range, but is generally between about 30° and 80°C. It is preferred to operate the vessel at substantially the boiling point of the reaction medium, whereby maximum rate of evaporation of water vapour is achieved. To maintain the reaction medium at its boiling point, the vessel preferably is subjected to an at least partial vacuum.

Chlorine dioxide gas at normal atmospheric pressure spontaneously decomposes with detonation. The water vapour dilutes the chlorine dioxide rendering it less susceptible to spontaneous decomposition. The chlorine dioxide and chlorine produced are removed from the generator as a mixture with the evaporated water.

The sodium acid sulphate crystallized in the vessel is separated from the liquor and transferred in accordance with this two-stage embodiment of the invention to a second single vessel generator-evaporator-crystallizer containing an aqueous reaction medium comprising sodium chlorate and a chloride which is sodium chloride, hydrochloric acid or a mixture thereof.

The sodium acid sulphate, whether in the form of sodium bisulphate or sodium sesquisulphate, supplies at least part of the acid requirement of the second vessel due to its acidic nature. The second vessel, therefore, operates at a low acidity, generally from about 2 to 4.8N. Any additional acid requirement may be provided by sulphuric acid. Sufficient water vapour is evaporated from the reaction medium to crystallize anhydrous sodium sulphate ($Na_2SO_4$) in the vessel.

Where sodium bisulphate is the sodium acid sulphate formed in the high acidity reaction and is used as the sole acid source in the low acidity reaction, then the reactions are represented by the following equations:

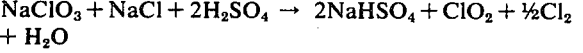

Therefore, if all of the sodium bisulphate formed in the first stage is utilized in the second stage as the sole acid scource, then the overall process produces half the chlorine dioxide in one stage and half in the other. The high acidity step is about 99 percent efficient in the conversion of sodium chlorate to chlorine dioxide but wastes acid values whereas the low acidity step is only about 94 percent efficient but no acid values are lost. It will be seen, therefore, that the overall process has an efficiency of about 96.5 percent for conversion of chlorate feed to chlorine dioxide with complete utilization of acid values.

Where the sodium sesquisulphate is the sodium acid sulphate formed in the high acidity reaction and is used as the sole acid source, then the reactions involved are represented by the following equations:

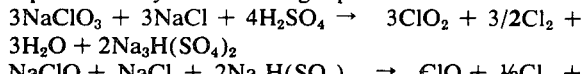
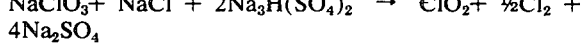

Therefore, if all of the sodium sesquisulphate formed at high acidity is utilized in the low acidity reaction as the sole acid source, then the overall process produces three-quarters of the total chlorine dioxide produced in the first step and one-quarter in the other. The high acidity step is about 99 percent efficient but again wastes acid values, whereas the low acidity step is only about 94 percent efficient but no acid values are lost. It will be seen therefore that the overall process has an efficiency of about 97.8 percent with complete utilization of acid values.

The evaporated water acts as a diluent for the chlorine dioxide and chlorine generated and the product gases are removed from the second vessel by the steam.

As in the case of the first vessel, the sodium chlorate and sodium chloride may be fed to the vessel as a single stream of aqueous solution, or as separate streams of aqueous solutions of the sodium chlorate and sodium chloride. Concentrations of the sodium chlorate and sodium chloride, temperature of reaction and other parameters are similar to those described above for the first vessel.

In particular, it is preferred that the mole ratio of chloride:chlorate be approximately 1:1, the reaction be carried out substantially at the boiling point of the reaction medium and that the vessel be maintained under a reduced pressure.

It is preferred that the process of the present invention be carried out continuously, so that in this embodiment sodium acid sulphate recovered from the first vessel is transferred continuously to the second vessel and anhydrous sodium sulphate is recovered continuously from the second vessel.

In the preferred embodiment wherein the process is operated continuously, the level of the reaction medium in each vessel is maintained substantially constant. Any overflow liquid from the first vessel is recycled to the reactant feed input of the first vessel and any overflow liquid from the second vessel is recycled to the reactant feed input of the second vessel.

It is possible to combine this system with other chlorine dioxide generators. For example, a further generator in which chlorate, chloride and sulphuric acid are reacted at high acidity, for example, 10 N may be provided.

This latter generator may be operated so that no acid sulphate is deposited in the vessel. The whole of liquid effluent from the generator may be passed to the high acidity generator precipitating acid sulphate. The effluent from one high acidity generator thereby forms part of the chlorate, chloride and acid requirement of another high acidity generator.

A number of chlorine dioxide generators may be operated in a series operation in this way with passage of liquid effluent from one generator to the next. It is essential, of course, that the last high acidity generator in the series, prior to the low acidity generator, be operated to precipitate acid sulphate for use as at least part of the acid requirement of the low acidity generator.

These additional generators may be of the type described above wherein steam is used to remove chlorine dioxide and chlorine from the generators, or of the R2-type mentioned above, using air as the diluting gas.

Further, an additional single vessel-type high acidity chlorine dioxide generator may be provided in parallel operation with the existing high acidity generator or generators. Such additional generator may be operated to precipitate acid sulphate. The acid sulphate from both high acidity generators may be forwarded to the low acidity chlorine dioxide generator as the acid requirement thereof.

In addition, where such generators are provided in parallel, one or more further high acidity generators of the steam dilution-type or R2-type may be provided. These latter generators may be operated so that acid sulphate is not precipitated therein, and the liquid effluent therefrom may be passed, partly to one and partly to the other of the parallel, acid sulphate-precipitating generators. Other combinations are possible as will be evident to the skilled practitioner.

Such combinations may be desirable where large quantities of chlorine dioxide is required and only limited capacity generators are available.

In another embodiment of the invention, a three-stage operation may be adopted. In such an operation, in the first stage a high acidity (i.e. greater than 4.8N) aqueous reaction medium containing sodium chlorate, sodium chloride and/or hydrogen chloride, and sulphuric acid is reacted to precipitate sodium bisulphate. In the second stage the sodium bisulphate is used as at least part of the acid requirement in a high acidity aqueous reaction medium containing also sodium chlorate, and sodium chloride and/or hydrogen chloride, sodium sesquisulphate being precipitated in this stage. The sodium sesquisulphate then is used in the third stage as at least part of the acid requirement in a low acidity (i.e. less than 4.8N) aqueous reaction medium containing in addition sodium chlorate and sodium chloride and/or hydrochloric acid. In the third stage, anhydrous sodium sulphate is precipitated. In each stage chlorine dioxide and chlorine are produced and are removed from the reaction zones by steam evaporated from the reaction media.

In this modification, it is preferred that the sole source of acid in the second stage be the sodium bisulphate and that the sole source of acid in the third stage be the sodium sesquisulphate.

As indicated above, the reaction media in the first and second reaction zones have acidities above 4.8N, preferably between about 6 and 12N, typically about 10N for the first zone, and between about 5 and 9N, typically about 8N for the second zone.

The reaction medium in the third reaction zone has an acidity below 4.8N, generally between 2 and 4.8N, typically about 4N.

The reaction media in all three zones preferably are maintained at their boiling temperature to afford maximum evaporation of water from the media. The zones generally are maintained under a reduced pressure and the reaction temperature is generally between about 30°C and 80°C.

In this second embodiment where all of the sodium bisulphate formed in the first stage is used as the sole acid source of the second stage and all of the sodium sesquisulphate formed in the second stage is used as the sole acid source of the third stage, the reactions involved are represented by the following equations:

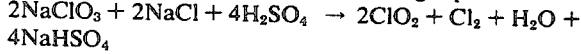
$2NaClO_3 + 2NaCl + 4H_2SO_4 \rightarrow 2ClO_2 + Cl_2 + H_2O + 4NaHSO_4$

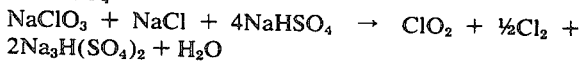
$NaClO_3 + NaCl + 4NaHSO_4 \rightarrow ClO_2 + \frac{1}{2}Cl_2 + 2Na_3H(SO_4)_2 + H_2O$

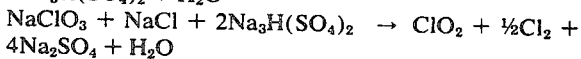
$NaClO_3 + NaCl + 2Na_3H(SO_4)_2 \rightarrow ClO_2 + \frac{1}{2}Cl_2 + 4Na_2SO_4 + H_2O$ Therefore, half of the total chlorine dioxide produced by the overall process is formed at high acidity utilizing sulphuric acid, one-quarter of the total chlorine dioxide is formed at high acidity using sodium bisulphate as the acid and one-quarter of the total chlorine dioxide is formed at low acidity using sodium sesquisulphate as the acid.

The high acidity reactions are about 99 percent efficient but involve acid losses whereas the low acidity reaction is about 94 percent efficient and involves no acid losses. The overall process therefore is about 97.8 percent efficient for conversion of sodium chlorate to chlorine dioxide and involves no acid losses.

The modifications discussed above with reference to the first embodiment involving combining the system with other chlorine dioxide generators may be utilized in this embodiment, with such appropriate changes as are necessary.

The anhydrous sodium sulphate recovered from the low acidity reaction may be used as a source of sodium and sulphur make-up in a Kraft recovery system. In the Kraft process for the production of cellulosic fibrous pulp, the fibrous cellulosic material, generally wood chips, is digested by heating with a "white liquor" containing sodium sulphide and sodium hydroxide to dissolve from the wood chips a substantial part of the hemicelluloses and the liquor and other extractable organic materials contained therein. The fibrous pulp so produced is separated from the resulting "black liquor" and washed and passed to bleaching operations.

The black liquor is subjected to a series of operations in a recovery system. The black liquor first is concentrated by evaporation of water and the concentrated black liquor is burnt in a furnace to yield a smelt containing sodium carbonate and sodium sulphide. The smelt is dissolved in water to yield a raw "green liquor" which then is clarified. The clarified green liquor is causticized with lime, whereby the sodium carbonate is converted into sodium hydroxide and calcium carbonate is precipitated as a mud. The mud is calcined after washing to regenerate lime for further causticization. The causticized green liquor then is recycled as white liquor.

To make up sodium and sulphur values of the system, sodium sulphate is added, generally to the black liquor before it is fed to the furnace. The sodium sulphate is reduced in the furnace to form sodium sulphide and sodium carbonate, the sodium carbonate being converted to sodium hydroxide on causticization. Thus, the sodium sulphide and sodium hydroxide content of the white liquor is maintained at the desired level.

Alternatively, part or all of the anhydrous sodium sulphate recovered could be converted into sulphuric acid by dissolving the sodium sulphate in a small amount of water and treating the solution with dry hydrogen chloride, in accordance with the invention described and claimed in copending application, Ser. No. 072,527, filed Jan. 20, 1970, assigned by the inventor William H.

Rapson to Electric Reduction Company of Canada, Limited.

The invention is further described with reference to the accompanying drawings in which.

Figure 1:
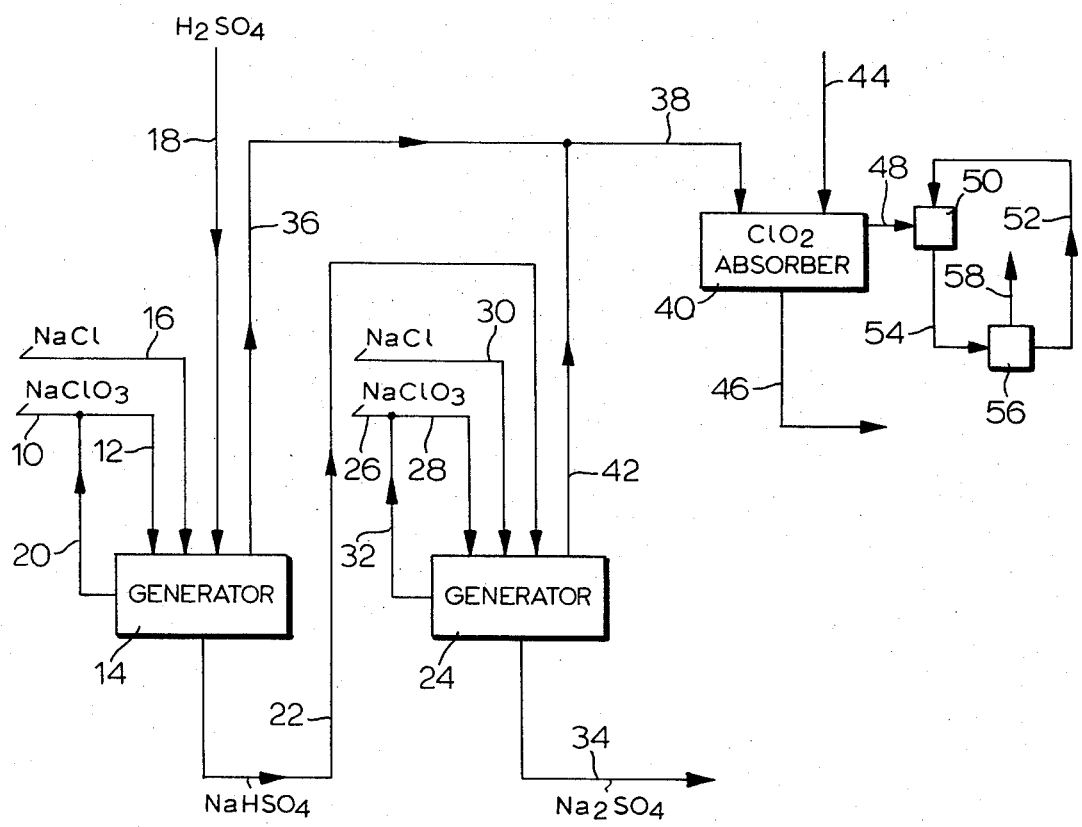
FIG. 1 is a flow sheet of one embodiment of the invention.

Referring to FIG. 1, sodium chlorate solution is fed through lines 10 and 12 to a first generator 14, such as the one described in the above-mentioned Canadian Patent 825,084, containing a boiling aqueous reaction medium of sodium chlorate, sodium chloride and sulphuric acid. Aqueous sodium chloride is fed to the generator 14 through line 16 and concentrated sulphuric acid is fed through line 18. The generator 14 is maintained under reduced pressure. Any overflow liquor, containing unreacted sodium chlorate, sodium chloride and sulphuric acid, is recycled by line 20 to the sodium chlorate inlet line 12.

The reactants are indicated to be fed in separate streams to the generator 14. In practice there may be only a single stream containing a mixture of the reactants, or two streams, one containing aqueous sodium chlorate and sodium chloride and the other containing sulphuric acid.

The rate of feed of the feed stream, the rate of removal of liquor as overflow and the rate of removal of water by evaporation are adjusted so that the level of reaction liquid in the generator 14 is maintained substantially constant.

Water is evaporated from the reaction medium and sodium acid sulphate crystallizes out of the reaction medium. The crystallized sodium acid sulphate is fed through line 22 to a second chlorine dioxide generator 24, such as the one described in the above-mentioned Canadian Patent 825,084.

Generator 24 contains a boiling aqueous reaction medium of sodium chlorate, sodium chloride and acid values. Aqueous sodium chlorate is fed to the generator 24 through lines 26 and 28, and an aqueous solution of sodium chloride is fed to the generator 24 through line 30. Generator 24 is maintained under a reduced pressure. Any overflow liquor, containing unreacted sodium chlorate, sodium chloride and acid, is recycled by line 32 to the sodium chlorate inlet line 28.

In the embodiment described the sodium acid sulphate in line 22 constitutes the sole acid feed for the generator 24. It may be desirable to supplement this acid feed with sulphuric acid.

The rate of feed of the feed streams, the rate of removal of liquor as overflow and the rate of removal of water by evaporation are adjusted so that the level of the reaction medium in the generator 24 is maintained substantially constant.

Water is evaporated from the reaction medium and anhydrous sodium sulphate crystallizes out of the reaction medium. The anhydrous sodium sulphate is removed from the generator 24 through line 34, for use in a Kraft mill or for further processing.

The gaseous products of generator 14, i.e. chlorine dioxide, chlorine and steam, are fed through lines 36 and 38 to a chlorine dioxide absorber 40. The gaseous products of generator 24, i.e. chlorine dioxide, chlorine and steam, are fed through line 42 to line 38. Water is fed by line 44 to the absorber 40 to absorb chlorine dioxide and some of the chlorine from the gaseous products and to condense a substantial part of the steam.

The liquid effluent of the absorber 40 consisting of an aqueous solution of chlorine dioxide containing some dissolved chlorine passes out of the absorber 40 through line 46. Such chlorine dioxide solution is suitable for use in and may be fed to the bleaching plant of the mill to bleach cellulosic pulp or paper.

Undissolved chlorine and remaining water vapour pass through line 48 to a vacuum inducing device 50 which serves to maintain the generators 14 and 24 under reduced pressure. The vacuum inducing device may be of any convenient construction, such as a venturi tube or a rotary pump.

Alternatively, the water fed by line 44 may be the feed of a water eductor used to produce the required vacuum.

The chlorine and remaining water vapour are contacted with recycled chlorine water from line 52 in the vacuum inducing device. The remaining water vapour thereby is condensed and the liquid products, together with gaseous chlorine, pass through line 54 to a separator 56. The gaseous chlorine is vented from the separator through line 58 for further use. The liquid in the separator 56 is recycled through line 52 to the vacuum inducing device 50.

Chlorine water may be tapped from the separator 56 from time to time, if the accumulation becomes too large, and utilized in the bleaching plant of the mill.

The sodium chlorate solution fed through lines 10 and 26 may be obtained from a chlorate cell, wherein an acid solution of sodium chloride is electrolyzed. Alternatively, the solutions could be made up from solid sodium chlorate.

An aqueous solution of sodium chlorate need not be fed to the generator 14 and may be replaced by a feed of dry sodium chlorate. Feeding dry sodium chlorate has the advantage that the quantity of water which is required to be evaporated to precipitate the sodium acid sulphate is reduced.

Not all of the sodium acid sulphate produced in the generator 14 need be fed to the generator 24. Part of the sulphate may be recovered as product and part fed to the generator 24. Further, part of the acid requirement of generator 24 may be supplied by sulphuric acid.

The sodium chloride solution fed to the generator may be replaced at least in part by hydrochloric acid. This may be desirable particularly in the case of generator 24, in order to maintain the quantity of sodium ion present in the solution at a lower level. Such hydrochloric acid may be supplied by burning part of the hydrogen off gas from a chlorate cell with part of the gaseous chlorine product from line 58, and dissolving the hydrogen chloride so formed in water.

Further, some of the recycled overflow from generator 14 may be fed to generator 24 as part of the sodium chlorate, sodium chloride and acid requirement of generator 24.

Alternatively, the sodium chloride feed and sodium chlorate feed may be provided by liquid effluent from a further high acidity chlorine dioxide generator, either of the same type as generator 14, but without precipitating sodium acid sulphate, or an $R_2$-type generator. Such feed also provides part of the acid requirement.

The first generator 14 is maintained at a high acidity, in excess of 4.8 N, generally around 8 to 12 N and the second generator 24 is maintained at a low acidity below 4.8 N, generally about 2 to 4 N. Both generators are maintained under vacuum at a boiling temperature of around 75°C.

Figure 2:
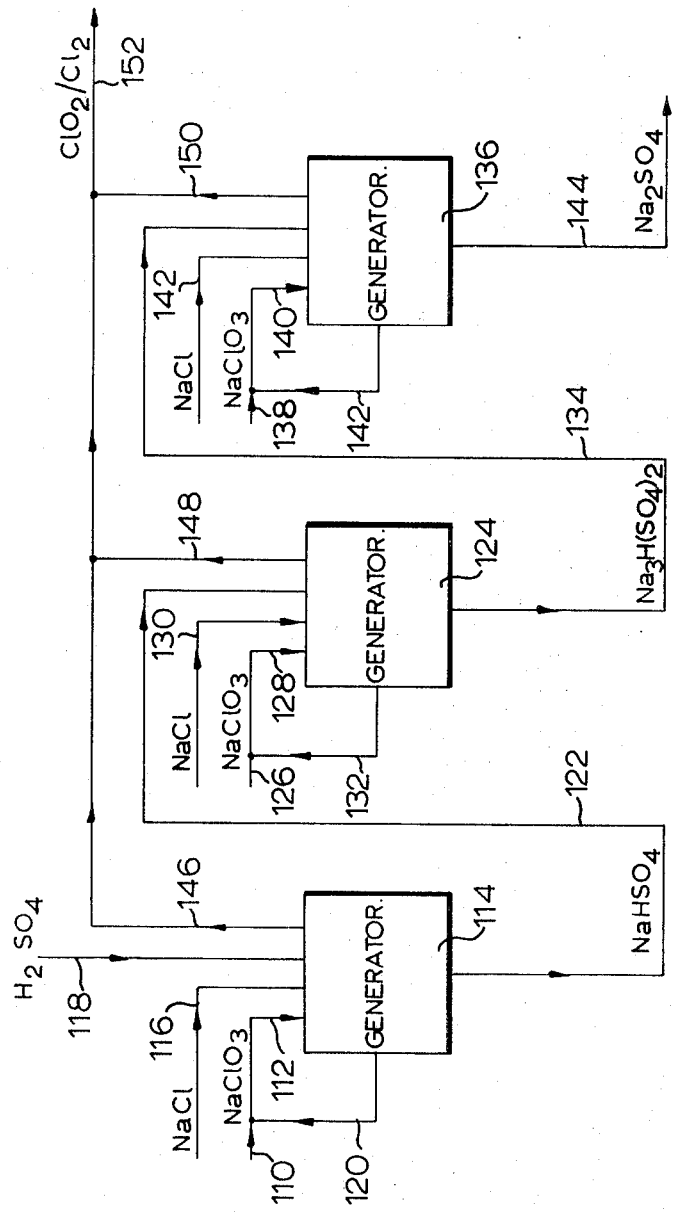
FIG. 2 is a flow sheet of a second embodiment of the invention.

Referring now to FIG. 2, sodium chlorate solution is fed through lines 110 and 112 to a first generator 114, containing a boiling aqueous reaction medium of sodium chlorate, sodium chloride and sulphuric acid having a high acidity, typically around 10 N. Aqueous sodium chloride solution is fed to the first generator 114 through line 116 and concentrated sulphuric acid is fed through line 118. The generator 114 is maintained under a reduced pressure in any convenient manner. Any overflow liquor from the reaction medium is recycled by line 120 to line 112.

While the sodium chlorate and sodium chloride are indicated to be fed in separate streams to the generator 114, in practice, there may be only a single stream containing these two reactants.

The rate of feed of the feed streams, the rate of removal of liquor as overflow and the rate of removal of water by evaporation are adjusted so that the level of the reaction liquor in the generator 114 is maintained substantially constant.

Water is evaporated from the reaction medium and sodium bisulphate crystallizes out of the reaction medium. The crystallized sodium bisulphate is fed by line 122 to a second chlorine dioxide generator 124.

The generator 124 contains a boiling aqueous reaction medium of sodium chlorate, sodium chloride and acid values. Feeds of aqueous sodium chlorate and sodium chloride to the generator 124 may be made by lines 126, 128 and 130. These feed streams may be combined into a single stream if desired.

The generator 124 is maintained under a reduced pressure. Any overflow liquor from the reaction medium in the generator 124 is recycled by line 132 to the line 128.

The sodium bisulphate in line 122 constitutes the sole source of acid in the generator 124. By appropriate adjustment of concentration, the reaction medium in the generator 124 has an acidity of about 7 to 8 N. It may be desired to supplement the acid feed from the bisulphate with sulphuric acid.

The rate of feed of the streams, the rate of removal of liquor as overflow and the rate or removal of water by evaporation are adjusted so that the level of the reaction liquor in the generator 124 is maintained substantially constant.

Water is evaporated from the reaction medium and sodium sesquisulphate crystallizes out of the reaction medium in generator 124 and is fed by line 134 to a third chlorine dioxide generator 136.

The generator 136 contains a boiling aqueous reaction medium of sodium chlorate, sodium chloride and acid values. Feeds of aqueous sodium chlorate and sodium chloride to the generator 136 may be made by lines 138, 140 and 142. A single feed stream containing sodium chloride and sodium chlorate may be used, if desired.

The generator 136 is maintained under a reduced pressure. Any overflow liquor from the reaction medium in the generator 136 is recycled by line 142 to the line 140.

The sodium sesquisulphate in line 134 constitutes the sole source of acid in the generator 136 and imparts to the reaction medium an acidity of between 2 to 4.8 N.

It may be desired to supplement the acid feed from the sesqusulphate with sulphuric acid.

The rate of feed of the streams, the rate of removal of liquor as overflow and the rate of removal of water by evaporation are adjusted so that the level of the reaction liquor in the generator 136 is maintained substantially constant.

Water is evaporated from the reaction medium in the generator 136 and anhydrous sodium sulphate crystallizes out of the reaction medium. The anhydrous sodium sulphate is removed from the generator 136 by line 144, for use in a Kraft mill or for further processing.

The gaseous products of the generators 114, 124 and 136 are removed respectively by lines 146, 148 and 150 and form a common stream 152 which may be passed to a chlorine dioxide absorber for separation of the chlorine dioxide and chlorine, as described above with reference to the embodiment of FIG. 1.

The generators 114, 124 and 136 may be of any convenient type, typically one described in the above-mentioned Canadian Patent 825,084.

The sodium chlorate fed to the generators 114, 124 and 136 may be provided in any convenient manner, for example, from a chlorate cell wherein an acid solution of sodium chloride is electrolyzed. The sodium chlorate may be dry fed, if desired.

The sodium chloride fed to the generators 114, 124 and 136 may be replaced at least in part by hydrochloric acid.

The generators 114, 124 and 136 as mentioned are maintained at the boiling point of the reaction medium at a reduced pressure, typically at a temperature of about 75°C.

The present invention provides a considerable advantage over the production of chlorine dioxide separately at high and low acidities.

Thus, the present invention has the advantage over the process carried out at high acidity in a single vessel generator-evaporator-crystallizer, in that the acid values present in the sodium acid sulphate crystallized from the generator are utilized and not lost from the system. The present invention has advantage over the process carried out at low acidity in a single vessel generator-evaporator-crystallizer, in that at least part of the sulphuric acid requirement can be supplied by a by-product acid material, which would otherwise not have its acid values recovered.

The only solid product of the process of the present invention is anhydrous sodium sulphate which is readily utilizable in the Kraft mill recovery process described above, or in the production of sulphuric acid, in accordance with the process of copending application, Ser. No. 072,527.

Further, a large quantity of water is required to be evaporated in the low acidity generator. By operating in accordance with the present invention, this quantity is reduced for the same overall quantity of chlorine dioxide and anhydrous sodium sulphate produced, so that the heat requirement of the system is reduced. In addition, the efficiency of conversion of sodium chlorate to chlorine dioxide by the low acidity process is increased by use of the process of the present invention, by contrast with operation of a single vessel generator-evaporator-crystallizer at low or high acidity.

Modifications are possible within the scope of this invention.

What I claim is:

1. A process for the production of chlorine dioxide which comprises generating chlorine dioxide and chlorine from a first aqueous reaction medium having an acidity from 6 to 12 N in a first reaction zone, said first aqueous reaction medium comprising sodium chlorate, a chloride selected from sodium chloride, hydrogen chloride and mixtures thereof, and a sulphate ion-containing acidic material, evaporating sufficient water from said first reaction medium to precipitate a sodium acid sulphate in said first reaction zone, recovering said sodium acid sulphate from said first reaction zone, forming a second aqueous reaction medium having an acidity from 2 to 4.8 N in a second reaction zone by feeding to an aqueous solution containing sodium chlorate and a chloride selected from sodium chloride, hydrogen chloride and mixtures thereof, a sulphate ion-containing acidic material comprising at least part of said sodium acid sulphate recovered from said first zone, said at least part of said sodium acid sulphate constituting at least a major proportion of said sulphate ion-containing acidic material, generating chlorine dioxide and chlorine from said second reaction medium in said second reaction zone, evaporating sufficient water from said second reaction medium to precipitate anhydrous sopium sulphate in said second reaction zone and recovering chlorine dioxide and chlorine generated in said first and second reaction zones.

2. The process of claim 1 wherein said first reaction medium and said second reaction medium are maintained at a boiling temperature, and said first and second zones are maintained under reduced pressure.

3. The process of claim 1 wherein said sulphate ion-containing acidic material in said first reaction medium is sulphuric acid.

4. A continuous process for the production of chlorine dioxide which comprises continuously feeding sodium chlorate and sodium chloride to a first reaction vessel containing a first aqueous reaction medium having an acidity from 6 to 12 N and comprising sodium chlorate, sodium chloride and sulphuric acid, continuously feeding sulphuric acid to said first reaction vessel, continuously generating chlorine dioxide and chlorine from said first reaction medium, continuously evaporting sufficient water from said first reaction medium to precipitate continuously sodium acid sulphate from said first reaction medium in said first vessel, continuously recovering from said first vessel a gaseous mixture comprising chlorine dioxide, chlorine and evaporated water, continuously recovering said precipitated sodium acid sulphate from said first vessel, feeding at least part of said recovered sodium acid sulphate to a second reaction vessel, said second reaction vessel containing a second aqueous reaction medium comprising sodium chlorate and sodium chloride, said second reaction medium having an acidity of from 2 to 4.8 N, at least a major proportion of said latter acidity being provided by said fed sodium acid sulphate, continuously feeding sodium chlorate and sodium chloride to said second vessel, continuously generating chlorine dioxide and chlorine from said second reaction medium, continuously evaporating sufficient water from said second reaction medium to precipitate continuously anhydrous sodium sulphate from said second reaction medium in said second vessel, continuously removing from said second vessel a gaseous mixture comprising chlorine dioxide, chlorine and evaporated water, and continuously recovering said precipitated anhydrous sodium sulphate from said second vessel.

5. The process of claim 4 wherein said first reaction medium and said second reaction medium are maintained at a boiling temperature and said first and second vessels are maintained under reduced pressure.

6. The process of claim 4 wherein an aqueous solution containing sodium chlorate and sodium chloride is fed to said second reaction vessel.

7. The process of claim 4 wherein an aqueous solution of sodium chlorate and an aqueous solution of sodium chloride are fed separately to said first vessel.

8. The process of claim 4 wherein an aqueous solution of sodium chlorate and an aqueous solution of sodium chloride are fed separately to said second vessel.

9. The process of claim 4 wherein dry sodium chlorate and dry sodium chloride are fed to said first reaction vessel.

10. A process for the production of chlorine dioxide which comprises generating chlorine dioxide and chlorine from a first aqueous reaction medium contained in a first reaction zone, said first aqueous reaction medium comprising sodium chlorate, a chloride selected from sodium chloride, hydrogen chloride and mixtures thereof, and a sulphate ion-containing acidic material, evaporating sufficient water from said first reaction medium and providing an acidity in said first reaction medium to precipitate a sodium acid sulphate from said first reaction zone, recovering said sodium acid sulphate from said first reaction zone, forming a second aqueous reaction medium having an acidity less than 4.8 N in a second reaction zone by feeding said recovered sodium acid sulphate to an aqueous solution containing sodium chlorate and a chloride selected from sodium chloride, hydrogen chloride and mixtures thereof, generating chlorine dioxide and chlorine from said second reaction medium in said second zone, evaporating sufficient water from said second reaction medium to precipitate anhydrous sodium sulphate in said second zone and recovering chlorine dioxide and chlorine generated in said first and second reaction zones.

* * * * *